US012456926B2

(12) United States Patent
Yang et al.

(10) Patent No.: US 12,456,926 B2
(45) Date of Patent: Oct. 28, 2025

(54) VOLTAGE REGULATOR FOR USE IN FLYBACK CONVERTER

(71) Applicant: Richtek Technology Corporation, Hsinchu (TW)

(72) Inventors: Ta-Yung Yang, Taoyuan (TW); Chao-Chi Chen, Hsinchu (TW); Yu-Chang Chen, Nantou (TW); Syuan-Zong Lan, Chuanghua (TW); Yi-Ju Lu, New Taipei (TW)

(73) Assignee: Richtek Technology Corporation, Hsinchu (TW)

( * ) Notice: Subject to any disclaimer, the term of this patent is extended or adjusted under 35 U.S.C. 154(b) by 315 days.

(21) Appl. No.: 18/458,996

(22) Filed: Aug. 30, 2023

(65) Prior Publication Data

US 2024/0297568 A1 Sep. 5, 2024

Related U.S. Application Data

(60) Provisional application No. 63/487,876, filed on Mar. 1, 2023.

(51) Int. Cl.
*H02M 3/335* (2006.01)
*H02M 1/00* (2006.01)
*H02M 1/42* (2007.01)
*H02M 3/158* (2006.01)

(52) U.S. Cl.
CPC ..... *H02M 3/33507* (2013.01); *H02M 1/0006* (2021.05); *H02M 1/4225* (2013.01); *H02M 3/1582* (2013.01); *H02M 3/33571* (2021.05)

(58) Field of Classification Search
CPC ....... H02M 1/0006; H02M 1/42–4233; H02M 3/1582; H02M 3/335–33592
See application file for complete search history.

(56) References Cited

U.S. PATENT DOCUMENTS

| 9,385,606 | B2* | 7/2016 | Bazzani | H02M 3/1582 |
| 2009/0262556 | A1 | 10/2009 | Tomiyoshi et al. | |
| 2013/0278232 | A1 | 10/2013 | Herbison | |
| 2022/0352821 | A1* | 11/2022 | Wildrick | H02M 1/0048 |

\* cited by examiner

*Primary Examiner* — Gary L Laxton
*Assistant Examiner* — Jennifer C Caulk
(74) *Attorney, Agent, or Firm* — Huan-Yi Lin

(57) ABSTRACT

A voltage regulator for converting an input voltage to an output voltage includes: a first and a second high-side switch, a first and a second low-side switch and a control terminal which is for generating a reference voltage or determining a forced pass-through mode. The output voltage is determined according to the reference voltage during a buck mode and a boost mode. When the input voltage is higher than a first threshold, the voltage regulator is operated in the buck mode. When the input voltage is lower than a second threshold, the voltage regulator is operated in the boost mode. When the input voltage is lower than the first threshold and is higher than the second threshold, the voltage regulator is operated in a pass-through mode. When a voltage of the control terminal is lower than a third threshold, the voltage regulator is operated in the forced pass-through mode.

17 Claims, 13 Drawing Sheets

VOLTAGE REGULATOR FOR USE IN FLYBACK CONVERTER

CROSS REFERENCE

The present invention claims priority to following provisional applications, Ser. No. 63/487,876, filed on Mar. 1, 2023.

BACKGROUND OF THE INVENTION

Field of Invention

The present invention relates to a voltage regulator. Particularly, it relates to a voltage regulator with high efficiency and low standby power across a wide voltage range for use in flyback converter.

Description of Related Art

A prior art of U.S. Pat. No. 7,268,525 "Buck-Boost Converter" disclosed the approach. Another prior art of U.S. Pat. No. 9,385,606 "Automatic Buck/Boost Mode Selection System for DC-DC Converter" disclosed the converter which can be operated in buck, boost or pass-through mode.

In recent development, many applications necessitate power supplies which can operate across a wide input voltage range while also consuming minimal power in standby mode to conserve energy. One such example is the USB-PD Type-C with EPR (extended power range), which provides a programmable output voltage from 5V to 48V (up to 240 W) to cater to a broad range of applications including mobile phone, portable computer, power tool and robot battery charging. When operating at 5V no-load, the system must draw minimal power. Therefore, the USB-PD EPR power adaptor and its control circuit must operate with high efficiency and low standby power across a wide voltage range. This invention aims to provide a voltage regulator that can satisfy these criteria.

SUMMARY OF THE INVENTION

From one perspective, the present invention provides a voltage regulator, configured to convert an input voltage to an output voltage, comprising: a first high-side switch, coupled to the input voltage, and coupled to an inductor through a first switch node; a first low-side switch, coupled to the first high-side switch, and coupled to the inductor through the first switch node; a second high-side switch, coupled to the output voltage, and coupled to the inductor through a second switch node; a second low-side switch, coupled to the second high-side switch, and coupled to the inductor through the second switch node; and a control terminal, configured to operably generate a reference voltage or determine a forced pass-through mode, wherein the output voltage is determined according to the reference voltage during a buck mode and a boost mode; wherein when the input voltage is higher than a first threshold, the voltage regulator is operated in the buck mode; wherein when the input voltage is lower than a second threshold, the voltage regulator is operated in the boost mode; wherein when the input voltage is lower than the first threshold and the input voltage is higher than the second threshold, the voltage regulator is operated in a pass-through mode; wherein when a voltage of the control terminal is lower than a third threshold, the voltage regulator is operated in the forced pass-through mode.

In one preferred embodiment, the voltage regulator further comprising a current source coupled to the control terminal; wherein the current source is applied to a resistor connected to the control terminal to determine the voltage level of the reference voltage.

In one preferred embodiment, the reference voltage is coupled to generated the first threshold and the second threshold.

In one preferred embodiment, a level of the first threshold is higher than a level of the second threshold, and the level of the second threshold is higher than a level of the third threshold.

In one preferred embodiment, the forced pass-through mode is enabled by pulling the voltage of the control terminal to a low level when the input voltage is lower than the first threshold.

In one preferred embodiment, the voltage regulator further comprising a first hysteresis-comparator and a second hysteresis-comparator; wherein the first hysteresis-comparator is coupled to receive the input voltage and the first threshold for determining the buck mode or the pass-through mode operation of the voltage regulator; wherein the second hysteresis-comparator is coupled to the input voltage and the second threshold for determining the pass-through mode or the boost mode operation of the voltage regulator when the input voltage is lower than the second threshold.

In one preferred embodiment, the voltage regulator is configured with a constant on-time (COT) control; wherein in the buck mode, an on-time of the first high-side switch is decreased in response to the increase of the input voltage, and the first high-side switch has a minimum off-time.

In one preferred embodiment, in the boost mode, the voltage regulator is configured with a constant on-time (COT) control, and an on-time of the second low-side switch is decreased in response to the increase of the input voltage, and the second low-side switch has a minimum off-time.

In one preferred embodiment, the voltage regulator is operated in discontinuous current mode (DCM) for the buck mode and the boost mode.

In one preferred embodiment, the first low-side switch is turned off before the inductor is fully demagnetized when the voltage regulator is operated in the buck mode.

In one preferred embodiment, the second high-side switch is turned off before the inductor is fully demagnetized when the voltage regulator is operated in the boost mode.

In one preferred embodiment, during the pass-through mode operation, the first high-side switch and the second high-side switch are turned on, and, the first low-side switch and the second low-side switch are turned off.

In one preferred embodiment, the first high-side switch, the second high-side switch, the first low-side switch and the second low-side switch are turned off before the operation mode is changed among the buck mode, the boost mode and the pass-through mode.

In one preferred embodiment, the voltage regulator is utilized to provide a bias supply for a conversion control circuit inside a power supply apparatus compliant with the USB-PD specification or for the conversion control circuit using an output power of the power supply apparatus compliant with the USB-PD specification.

In one preferred embodiment, the power supply apparatus compliant with the USB-PD specification includes a flyback converter.

In one preferred embodiment, a secondary side controller of the power supply apparatus compliant with the USB-PD specification controls the control terminal through an opto coupler.

In one preferred embodiment, an output power of the voltage regulator is less than 1 W (watt).

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
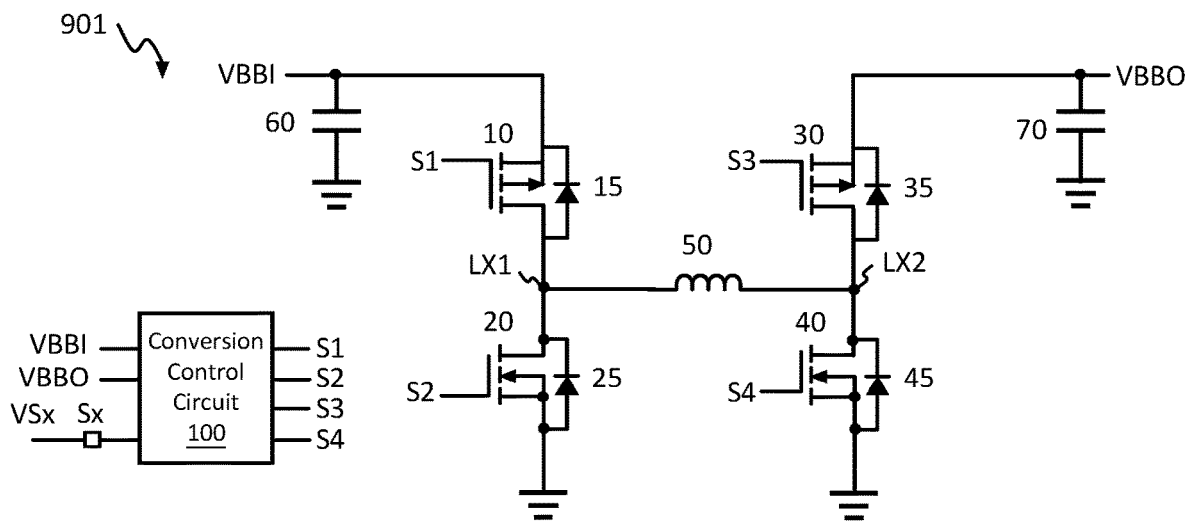
FIG. 1 shows a schematic diagram of a preferred embodiment of the voltage regulator according to the present invention.

FIG. 1 shows a schematic diagram of a preferred embodiment of the voltage regulator according to the present invention. In one embodiment, a voltage regulator 901 is configured to convert an input voltage VBBI to an output voltage VBBO, which comprises a first high-side switch (switch 10 with a body diode 15), a first low-side switch (switch 20 with a body diode 25), a second high-side switch (switch 30 with a body diode 35), a second low-side switch (switch 40 with a body diode 45) and a control terminal Sx.

In one embodiment, as shown in FIG. 1, the switch 10 is coupled to the input voltage VBBI, and is coupled to an inductor 50 through a first switch node LX1. The switch 20 is coupled to the switch 10, and is coupled to the inductor 50 through the first switch node LX1. The switch 30 is coupled to the output voltage VBBO, and is coupled to the inductor 50 through a second switch node LX2. The switch 40 is coupled to the switch 30, and is coupled to the inductor 50 through the second switch node LX2. In this embodiment, the switch 10 and the switch 30 are P-MOSFET, and the switch 20 and the switch 40 are N-MOSFET.

In one embodiment, the voltage regulator 901 also comprises a conversion control circuit 100 generating plural control signals S1, S2, S3 and S4, which are configured to control the switch 10, 20, 30 and 40 respectively. The conversion control circuit 100 generates the control signals S1, S2, S3 and S4 according to the input voltage VBBI, the output voltage VBBO and a control voltage VSx of the control terminal Sx. In one embodiment, the control voltage VSx is generated at the control terminal Sx.

In one embodiment, the control terminal Sx is configured to operably generate a reference voltage VR or to operably determine a forced pass-through mode, wherein the output voltage VBBO is determined according to the reference voltage VR during a buck mode and a boost mode. In one embodiment, the input voltage VBBI, the output voltage VBBO and the control voltage VSx are configured to determine whether the voltage regulator 901 is operated in the buck mode, the boost mode, the pass-through mode or the forced pass-through mode, which will be explained in detail later.

When the voltage regulator 901 is operated in the buck mode, the switch 10 and the switch 20 are switching, the switch 30 is turned on, and the switch 40 is turned off. When the voltage regulator 901 is operated in the boost mode, the switch 30 and the switch 40 are switching, the switch 10 is turned on, and the switch 20 is turned off. When the voltage regulator 901 is operated in the pass-through mode or in the forced pass-through mode, the switch 10 and the switch 30 are turned on, and the switch 20 and the switch 40 are turned off. A capacitor 60 is connected to the input voltage VBBI and a capacitor 70 is connected to the output voltage VBBO.

Figure 2:
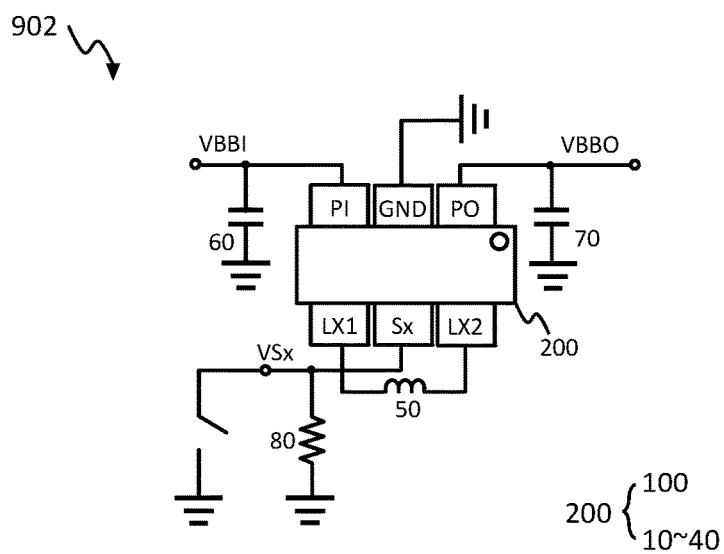
FIG. 2 shows a block diagram of a preferred embodiment corresponding to the voltage regulator shown in FIG. 1, wherein the conversion control circuit and the plural switches are integrated into an integrated circuit.

FIG. 2 shows a block diagram of a preferred embodiment corresponding to the voltage regulator shown in FIG. 1, wherein the conversion control circuit and the plural switches are integrated into an integrated circuit (200). In one embodiment, in the voltage regulator 902, an integrated circuit 200 includes the conversion control circuit 100 and the switches 10~40 shown in FIG. 1. In this embodiment, the control terminal Sx corresponds to a control pin of the integrated circuit 200, the first switch node LX1 corresponds to a first switch pin of the integrated circuit 200, and the second switch node LX2 corresponds to a second switch pin of the integrated circuit 200. The integrated circuit 200 is connected to the input voltage VBBI, the output voltage VBBO and ground through an input pin PI, an output pin PO and a ground pin GND respectively.

In one embodiment, as shown in FIG. 2, a resistor 80 is connected to the control terminal Sx to generate a control voltage VSx for further generating a reference voltage VR for determining the voltage level of the output voltage VBBO. The reference voltage VR is further coupled to generate a first threshold VT1 and a second threshold VT2 for determining the operation mode, such as buck, boost or pass-through mode. During the pass-through mode, switching of the switching circuit (e.g. the switches 10~40) of the voltage regulator 902 is disabled to save the power consumption.

Figure 3:
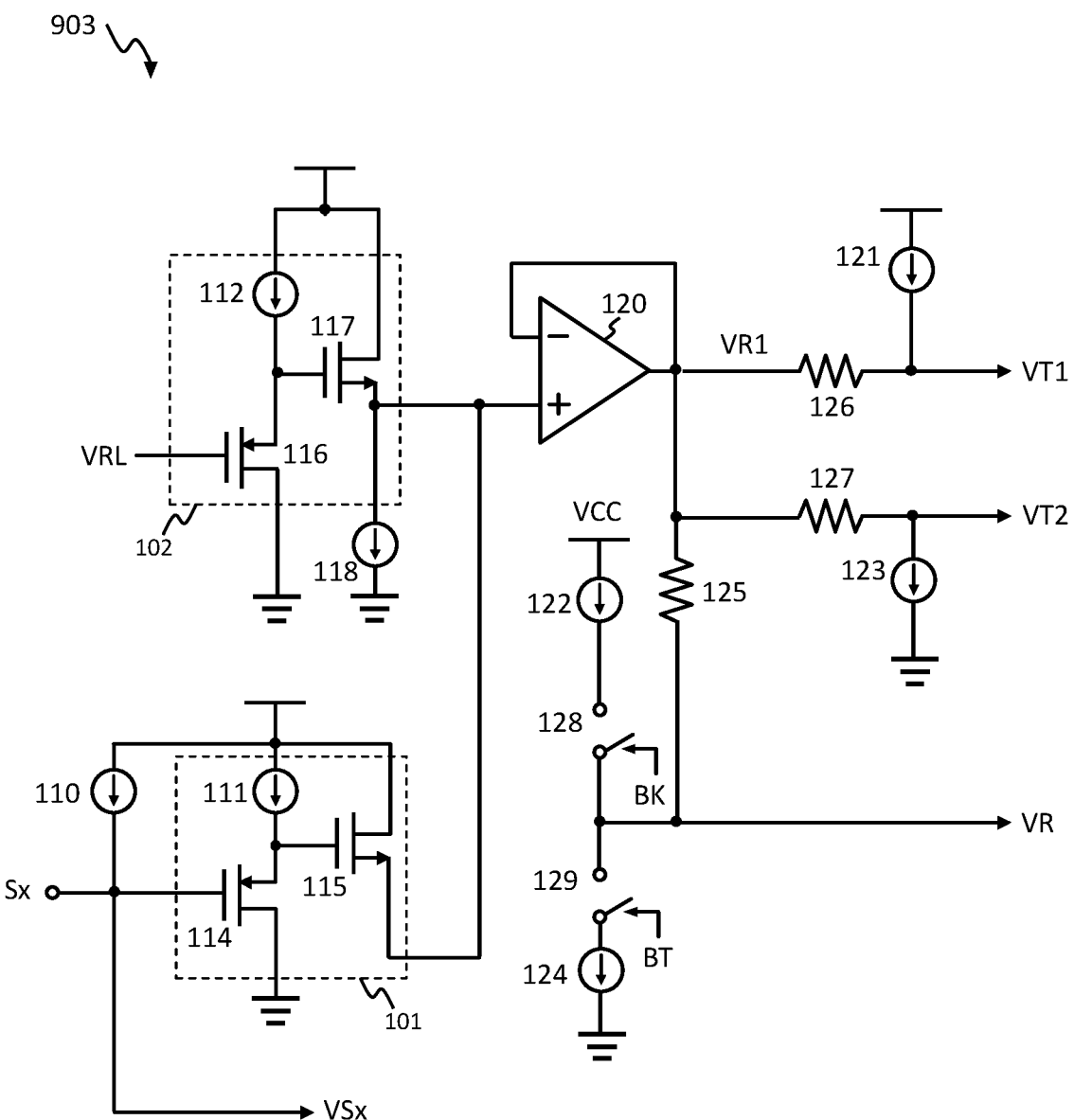
FIG. 3 shows a schematic diagram of a preferred embodiment of a reference signal generation circuit for generating the reference voltage, the first threshold and the second threshold according to the present invention.

FIG. 3 shows a schematic diagram of a preferred embodiment of a reference signal generation circuit 903 for generating the reference voltage VR, the first threshold VT1 and the second threshold VT2 according to the present invention. A current source 110 and the resistor 80 (that is connected to the control terminal Sx as shown in FIG. 2) determine the control voltage VSx which is further coupled to determine the voltage level of a reference voltage VR1. In this embodiment, the voltage level of the reference voltage VR1 is close to the voltage level of the control voltage VSx In one embodiment, a current source 111 and transistors 114, 115 are configured as a first buffer circuit 101. The control terminal Sx is connected to the input of the first buffer circuit 101. A current source 112 and transistors 116, 117 are configured as a second buffer circuit 102. A minimum reference voltage VRL is connected to the input of the second buffer circuit 102. The output of the first buffer circuit 101 and the output of the second buffer circuit 102 are connected, in a wired-OR configuration, to a current source 118 and a buffer 120 to generate the reference voltage VR1 at the output of the buffer 120. In this embodiment, if the control voltage VSx is pulled-low to the ground, the reference voltage VR1 can still remain the voltage level of the minimum reference voltage VRL.

In one embodiment, as shown in FIG. 3, a current source 121 and a resistor 126 are connected to the reference voltage VR1 to generate the first threshold VT1. A current source 123 and a resistor 127 are connected to the reference voltage VR1 to generate the second threshold VT2. The first threshold VT1 and the second threshold VT2 can be expressed as the following equations.

$$VT1 = VR1 + (I121 \times R126)$$
$$VT2 = VR1 - (I123 \times R127)$$

In the above equations, I121 and I123 are the current values corresponding to the current source 121 and 123 respectively. R126 and R127 are the resistance values corresponding to the resistor 126 and 127 respectively.

In one embodiment, a resistor 125 is connected to the reference voltage VR1 for generating the reference voltage VR. A buck signal BK controls a switch 128. A boost signal BT controls a switch 129. The reference voltage VR is further biased by a current source 122 during the buck mode, or is further biased by a current source 124 during the boost mode.

In the buck mode, the reference voltage VR can be expressed as the following equations.

$$VR = VR1 + (I122 \times R125)$$

In the boost mode, the reference voltage VR can be expressed as the following equations.

$$VR = VR1 - (I124 \times R125)$$

In the pass-through mode, the reference voltage VR can be expressed as the following equations.

$$VR = VR1$$

In the above equations, I122 and I124 are the current values corresponding to the current source 122 and 124 respectively. R125 is the resistance value corresponding to the resistor 125.

Figure 4:
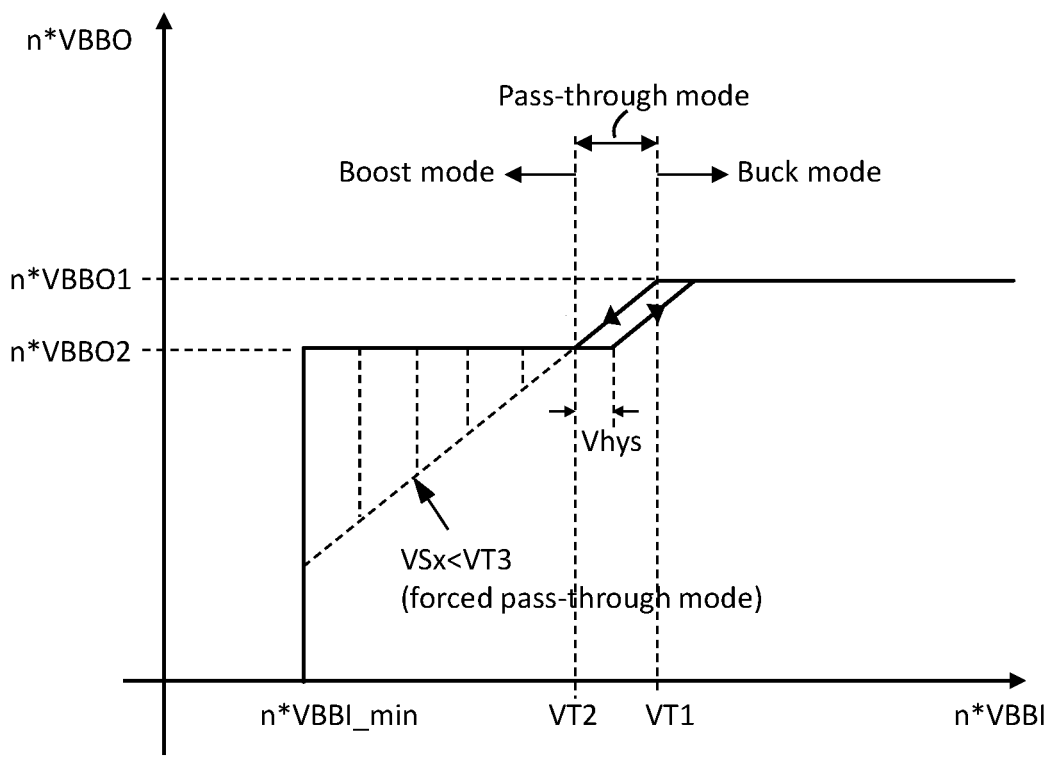
FIG. 4 shows characteristic curves of a preferred embodiment of the output voltage versus the input voltage and the control terminal according to the present invention.

FIG. 4 shows characteristic curves of a preferred embodiment of the output voltage versus the input voltage and the control terminal according to the present invention. In one embodiment, an input attenuator is configured to generate an attenuated input voltage n*VBBI according to the input voltage VBBI, wherein "n" is a real number greater than zero. An output attenuator is configured to generate an attenuated output voltage n*VBBO according to the output voltage VBBO.

In one embodiment, as shown in FIG. 4, when the attenuated input voltage n*VBBI is higher than the first threshold VT1, the voltage regulator (e.g. 901) is operated in the buck mode, and the attenuated output voltage n*VBBO is regulated to a first level n*VBBO1. When the attenuated input voltage n*VBBI is lower than the second threshold VT2, the voltage regulator is operated in the boost mode, and the attenuated output voltage n*VBBO is regulated to a second level n*VBBO2. When the attenuated input voltage n*VBBI is lower than the first threshold VT1 and is higher than the second threshold VT2, the voltage regulator is operated in the pass-through mode. When the control voltage VSx is lower than a third threshold VT3, the voltage regulator is operated in the forced pass-through mode.

Note that, in the above embodiment, a level of the first threshold VT1 is higher than a level of the second threshold VT2, and the level of the first threshold VT1 is higher than a level of the third threshold VT3. In one embodiment, the forced pass-through mode is enabled by pulling the control voltage Vsx to a low level (lower than VT3) when the input voltage n*VBBI is lower than the first threshold VT1.

In one embodiment, as shown in FIG. 4, when the operation of the voltage regulator is changed from the buck mode to the pass-through mode, or from the boost mode to the pass-through mode, a hysteresis voltage Vhys is configured for better noise immunity. When the attenuated input voltage n*VBBI is lower than a minimum voltage n*VBBI min, the attenuated output voltage n*VBBO is controlled to be zero.

Figure 5:
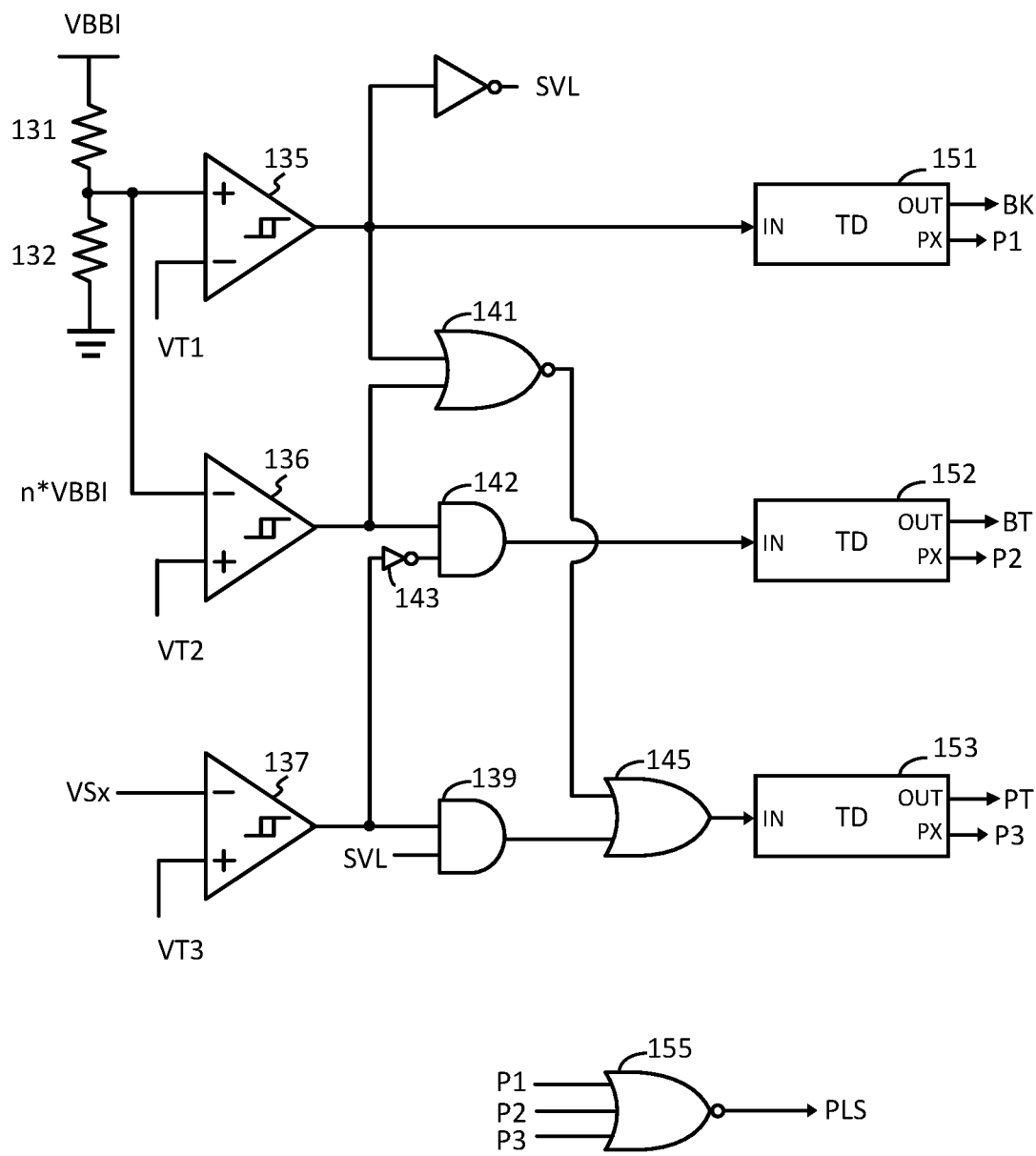
FIG. 5 shows a schematic diagram of a preferred embodiment of a mode determination circuit for determining buck mode, boost mode or pass-through mode (also forced pass-through mode) operations according to the present invention.

FIG. 5 shows a schematic diagram of a preferred embodiment of a mode determination circuit 905 for determining buck mode, boost mode, pass-through mode or forced pass-through mode operations according to the present invention. In one embodiment, resistors 131, 132 are configured as the input attenuator and are configured to generate the attenuated input voltage n*VBBI according to the input voltage VBBI.

In one embodiment, a first hysteresis-comparator 135 is coupled to receive the input voltage VBBI (in this embodiment is the attenuated input voltage n*VBBI) and the first threshold VT1 for determining the buck mode or the pass-through mode operation of the voltage regulator. Specifically, the first hysteresis-comparator 135 is configured to generate the buck signal BK through a time-delay circuit (TD) 151 when the attenuated input voltage n*VBBI is higher than the threshold VT1.

A second hysteresis-comparator 136 is coupled to the input voltage VBBI (in this embodiment is the attenuated input voltage n*VBBI) and the second threshold VT2 for determining the pass-through mode or the boost mode operation of the voltage regulator when the input voltage is lower than the second threshold. Specifically, the second hysteresis-comparator 136 is configured to generate the boost signal BT through a time-delay circuit (TD) 152 and an AND gate 142 when the attenuated input voltage n*VBBI is lower than the second threshold VT2.

When the voltage level of the control voltage VSx is lower than the third threshold VT3 and the attenuated input voltage n*VBBI is lower than the first threshold VT1 (a signal SVL is logic-high), a third hysteresis-comparator 137 is configured to generate a forced pass-through signal PT through a time-delay circuit (TD) 153, an OR gate 145 and an AND gate 139. Therefore, the forced pass-through mode can be enabled by pulling the voltage level of the control voltage VSx to a low level when the attenuated input voltage n*VBBI is lower than the threshold VT1. The output terminal of the third hysteresis-comparator 137 is further configured to disable the boost signal BT through the AND gate 142 and an inverter 143 when the voltage level of the control voltage VSx is lower than the third threshold VT3. The forced pass-through signal PT is further enabled through the OR gate 145 and a NOR gate 141 when the buck signal BK and the boost signal BT are disabled.

In one embodiment, as shown in FIG. 5, each of the time-delay circuits 151, 152 and 153 include an input terminal IN and two output terminals OUT and PX. The time-delay circuits 151, 152 and 153 are further configured to generate pulse signals P1, P2 and P3 respectively during the delay time of its output from logic-low to logic-high. A NOR gate 155 is configured to receive the pulse signals P1, P2 and P3 (high-true signal) to generate a pulse signal PLS (low-true signal).

Figure 6A:
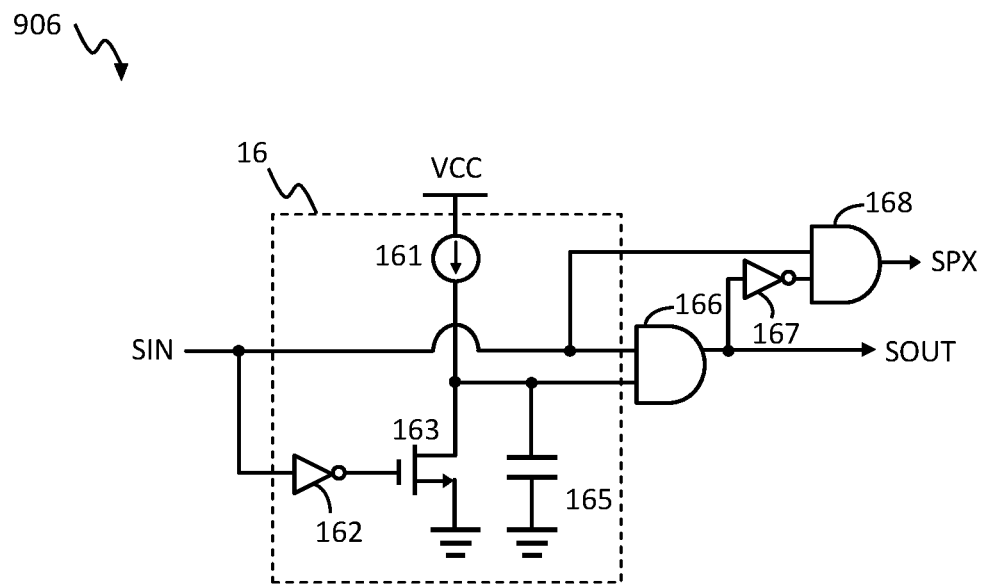
FIG. 6A shows a schematic diagram of a specific embodiment of the time-delay circuit according to the present invention.
Figure 6B:
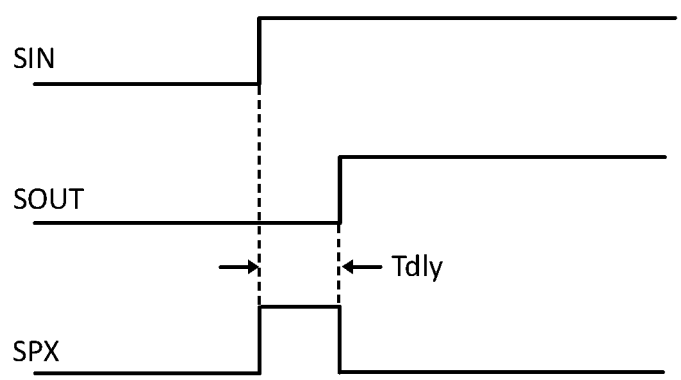
FIG. 6B shows operating waveforms corresponding to the time-delay circuit shown in FIG. 6A according to the present invention.

FIG. 6A shows schematic diagram of a specific embodiment of the time-delay circuit 906 according to the present invention. FIG. 6B shows operating waveforms corresponding to the time-delay circuit shown in FIG. 6A according to the present invention. A time-delay circuit 906 is a specific embodiment corresponding to the time-delay circuits 151, 152 and 153 in FIG. 5. In the time-delay circuit 906, an input signal SIN, an output signal SOUT and a pulse signal SPX are coupled to the input terminal IN and the output terminals OUT and PX respectively.

In one specific embodiment, a current source 161, an inverter 162, a transistor 163 and a capacitor 165 are configured as a time generator circuit 16 to determine a delay time Tdly. An AND gate 166 is configured to generate the output signal SOUT according to the input signal SIN and the output of the time generator circuit 16. The output signal SOUT connects to an AND gate 168 through an inverter 167. The AND gate 168 is further configured to receive the input signal SIN to generate the pulse signal SPX (such as the pulse signals P1, P2 and P3 in FIG. 5).

In the above embodiment, as shown in FIG. 6B, the pulse signal SPX turns to high level when the input signal SIN turns to high level, and the pulse signal SPX turns to low level when the output signal SOUT turns to high level. The pulse signal SPX is configured to indicate the delay time Tdly.

Figure 7:
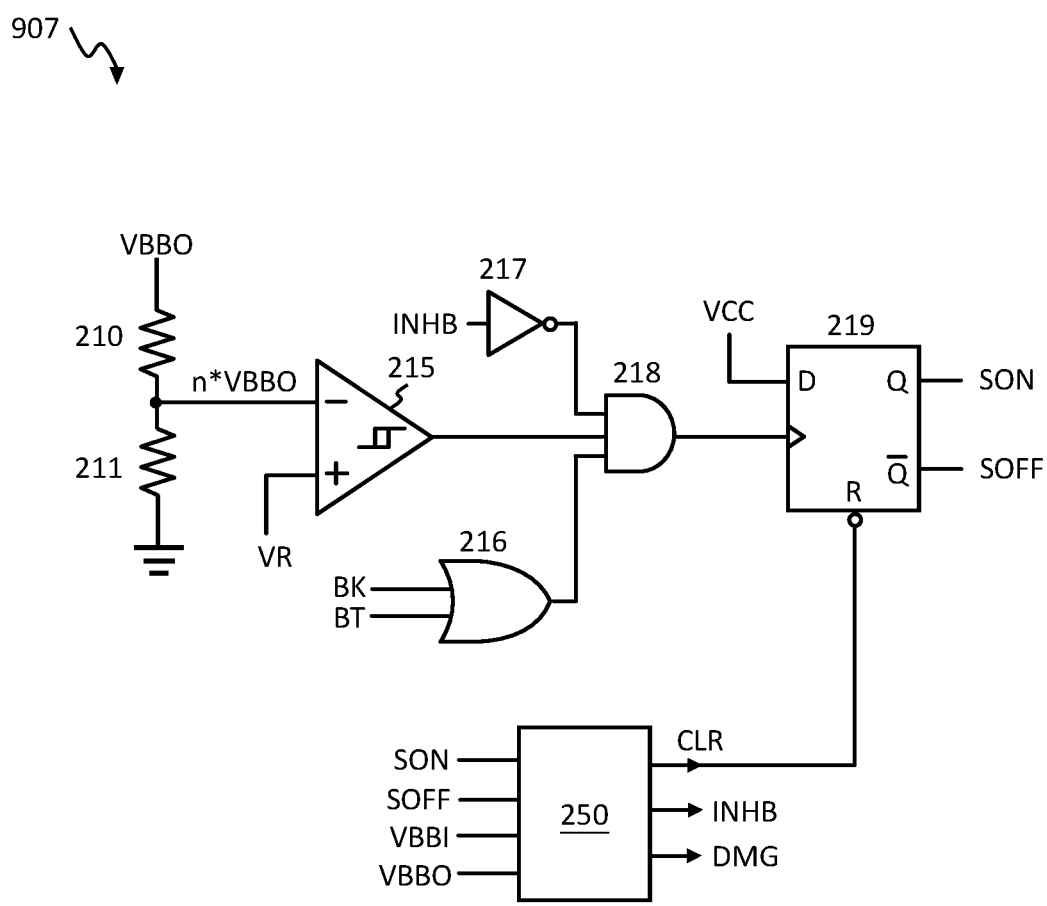
FIG. 7 shows a schematic diagram of a preferred embodiment of a modulation control circuit that generates switching signals for the buck mode and the boost mode operations according to the present invention.

FIG. 7 shows a schematic diagram of a preferred embodiment of a modulation control circuit 907 that generates switching signals for the buck mode and the boost mode operations according to the present invention. In one embodiment, the modulation control circuit 907 is configured to generate the switching signal SON for constant on-time (COT) control. The on-time of the switching signal SON is further adjusted by the voltage level of the input voltage VBBI. When the input voltage VBBI is increased, the on-time of the switching signal SON will be decreased.

In one embodiment, resistors 210, 211 are configured as the output attenuator and are configured to generate the attenuated output voltage n*VBBO according to the output voltage VBBO. The buck signal BK and the boost signal BT are connected to an OR gate 216. The output of the OR gate 216 is connected to an AND gate 218. When the attenuated output voltage n*VBBO is lower than the reference voltage VR during the buck mode or the boost mode operation, a comparator 215 will turn on a flip-flop 219 to generate the switching signal SON. The switching signal SON will determine the on-time of the control signals S1 and S4 in the buck mode and the boost mode operation.

A switching signal SOFF is an inverse signal of the switching signal SON. After the switching signal SON is enabled, an ON-time control circuit 250 is configured to determine the on-time of the switching signal SON and to generate a clear signal CLR to reset the flip-flop 219 for disabling the switching signal SON. The ON-time control circuit 250 is configured to generate the clear signal CLR, a demagnetizing signal DMG and an inhibit signal INHB according to the switching signal SON, the switching signal SOFF, the input voltage VBBI and the output voltage VBBO. The inhibit signal INHB is connected to the AND gate 218 through an inverter 217. When the switching signal SON is disabled, the switching signal SON cannot be enabled again until the inhibit signal INHB is disabled. Therefore, the period of the inhibit signal INHB determines the maximum switching frequency of the switching signal SON, such that the voltage regulator is operated in a DCM (discontinuous current mode).

Figure 8:
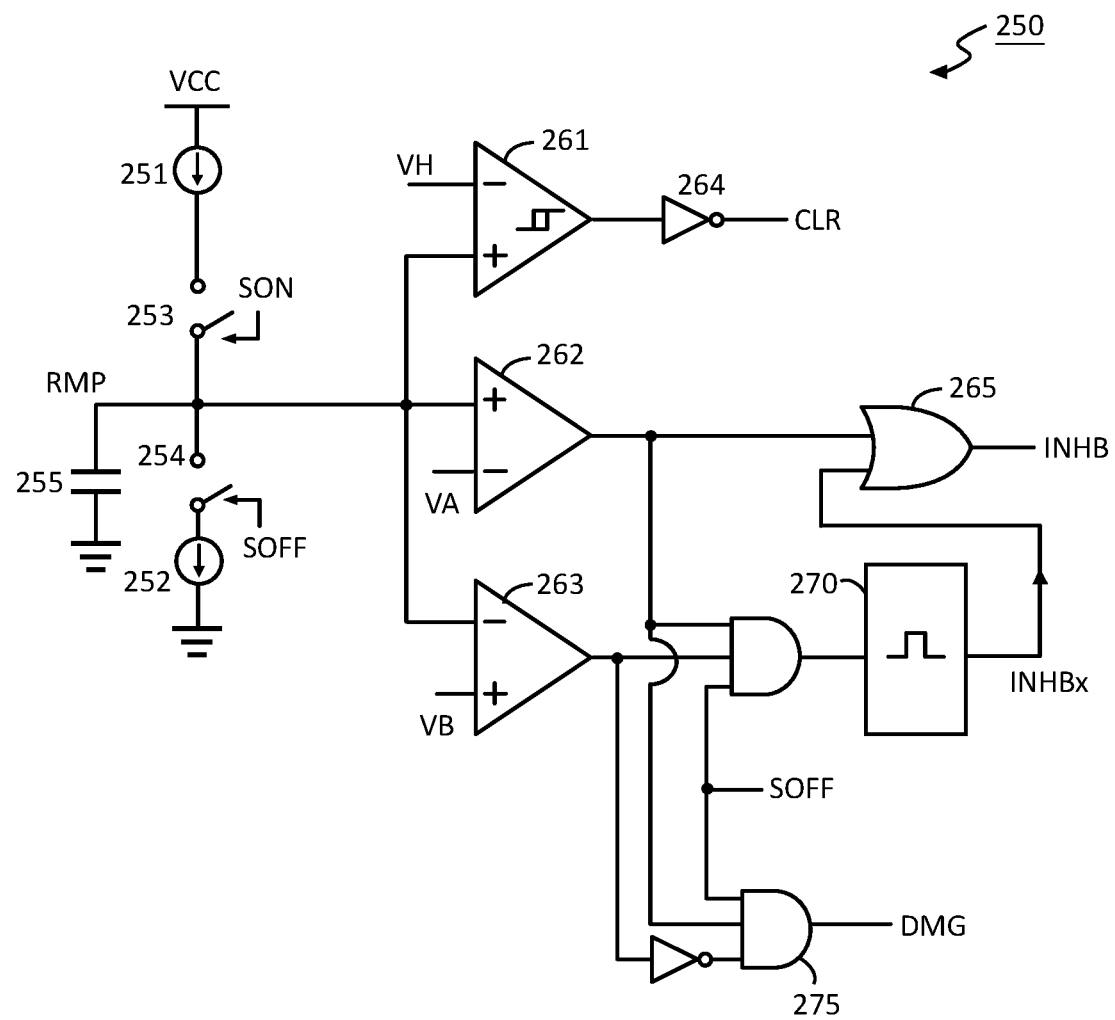
FIG. 8 shows a schematic diagram of a specific embodiment of an ON-time control circuit according to the present invention.

FIG. 8 shows a schematic diagram of a specific embodiment of the ON-time control circuit 250 according to the present invention. In one embodiment, the switching signal SON is configured to control a switch 253 to turn on a current source 251 to charge a capacitor 255, and the switching signal SOFF is configured to control a switch 254 to turn on a current source 252 to discharge the capacitor 255, whereby generating a ramp signal RMP. When the voltage level of the ramp signal RMP is higher than a threshold VH, a comparator 261 and an inverter 264 generates the clear signal CLR. The current value of the current source 251 (I251) and of the current source 252 (I252) can be expressed as the following equations.

$$I251 = I1 + [(VBBI - V1)/Rx]$$
$$I252 = I2 + [(VBBO - V2)/Rx]$$

In the above equations, I1 is a minimum charging current, I2 is a minimum discharging current, Rx is a constant value related to the inductance of the inductor 50, V1 is related to a minimum value of the output voltage VBBO in the buck mode operation, and V2 is related to a minimum value of the input voltage VBBI in the boost mode operation.

In one embodiment, if the voltage level of the ramp signal RMP is higher than a threshold VA, a comparator 262 and an OR gate 265 generate the inhibit signal INHB. When the switching signal SOFF is enabled to discharge the capacitor 255 and the voltage level of the ramp signal RMP is discharged to be lower than a threshold VB, a comparator 263 triggers a pulse generator 270 to generate an extended-pulse signal INHBx. The extended-pulse signal INHBx is further connected to the OR gate 265 to extend the inhibit signal INHB. An AND gate 275 is configured to generate the demagnetizing signal DMG when the switching signal SOFF is enabled and the voltage level of the ramp signal RMP is higher than the thresholds VA and VB. The demagnetizing signal DMG indicates the period that the inductor 50 is still in a demagnetizing time. The period of the demagnetizing signal DMG is shorter than the fully demagnetized period of the inductor 50.

Figure 9A:
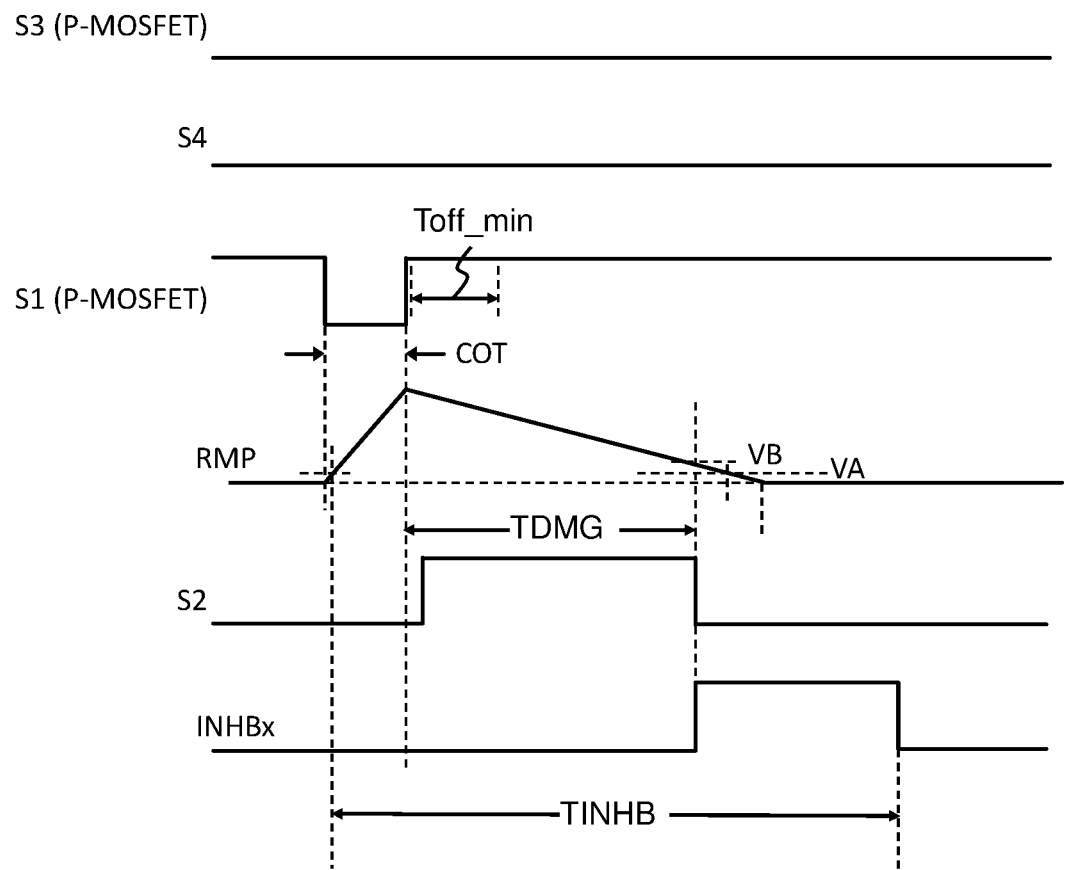
FIG. 9A shows the buck mode operating waveforms corresponding to the ON-time control circuit shown in FIG. 8 according to the present invention.

FIG. 9A shows the buck mode operating waveforms corresponding to the ON-time control circuit shown in FIG. 8 according to the present invention. In one embodiment, the voltage regulator (e.g. 901) is configured with a constant on-time (COT) control. As shown in FIG. 9A, when the voltage regulator is operated in the buck mode, an on-time of the switch 10 (the first high-side switch) is decreased in response to the increase of the input voltage VBBI. In one embodiment, the switch 10 (the first high-side switch) has a minimum off-time Toff_min.

Refer to FIG. 8 and FIG. 9A. Specifically, when the voltage regulator is operated in the buck mode, the level of the control signal S3 remains low for turning on the switch 30 which is a P-MOSFET, and the level of the control signal S4 remains low for turning off the switch 40. The switching signal SON is configured to charge the capacitor 255 and generate the control signal S1 to magnetize the inductor 50 during the constant on-time COT. The switching signal SOFF is configured to discharge the capacitor 255. The switching signal SOFF and the demagnetizing signal DMG (with an on-time TDMG) is configured to generate the control signal S2 to demagnetize the inductor 50 during a demagnetizing period (TDMG). When the ramp signal RMP is discharged lower than the threshold VB, the extended-pulse signal INHBx is generated to extend the inhibit signal INHB. A period TINHB shows the inhibit signal INHB is enabled when the ramp signal RMP is charged higher than the threshold VA. The inhibit signal INHB is disabled at the end of the extended-pulse signal INHBX.

Figure 9B:
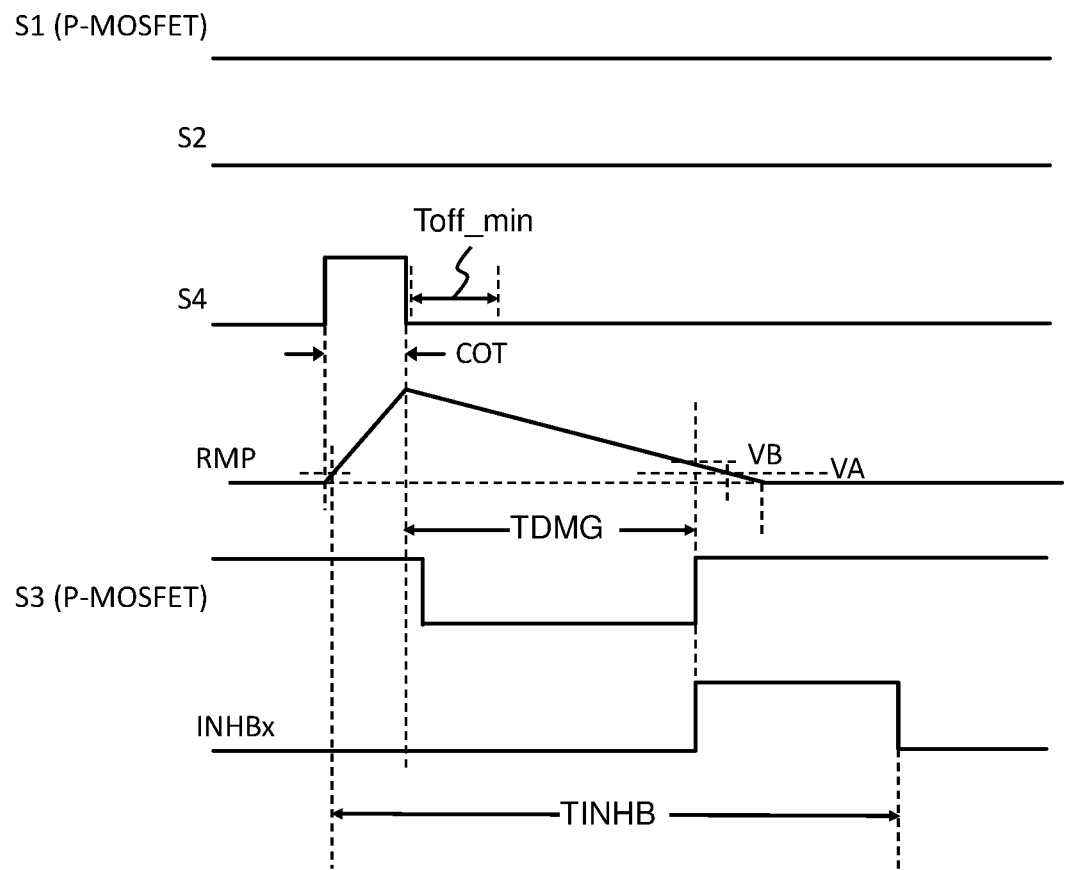
FIG. 9B shows the boost mode operating waveforms corresponding to the ON-time control circuit shown in FIG. 8 according to the present invention.

FIG. 9B shows the boost mode operating waveforms corresponding to the ON-time control circuit shown in FIG. 8 according to the present invention. In one embodiment, the voltage regulator (e.g. 901) is configured with a constant on-time (COT) control. In one embodiment, as shown in FIG. 9B, when the voltage regulator is operated in the boost mode, an on-time of the switch 40 (the second low-side switch) is decreased in response to the increase of the input voltage VBBI. In one embodiment, the switch 40 (the second low-side switch) has a minimum off-time Toff_min.

Refer to FIG. 8 and FIG. 9B. Specifically, when the voltage regulator is operated in the boost mode, the level of the control signal S1 remains low for turning on the switch 10 which is a P-MOSFET, and the level of the control signal S2 remains low for turning off the switch 20. The switching signal SON is configured to generate the control signal S4 to magnetize the inductor 50 during the constant on-time COT. The switching signal SOFF and the demagnetizing signal DMG (with an on-time TDMG) is configured to generate the control signal S3 to demagnetize the inductor 50 during a demagnetizing period (TDMG). Other details can be inferred from the description of FIG. 9A.

Note that, in one embodiment, the voltage regulator is operated in discontinuous current mode (DCM) for the buck mode and the boost mode (as shown in FIG. 9A and FIG. 9B). In one embodiment, as shown in FIG. 9A, the switch 20 (the first low-side switch controlled by the control signal S2) is turned off before the inductor 50 is fully demagnetized when the voltage regulator is operated in the buck mode. In one embodiment, as shown in FIG. 9B, the switch 30 (the second high-side switch controlled by the control signal S3) is turned off before the inductor 50 is fully demagnetized when the voltage regulator is operated in the boost mode.

Figure 10:
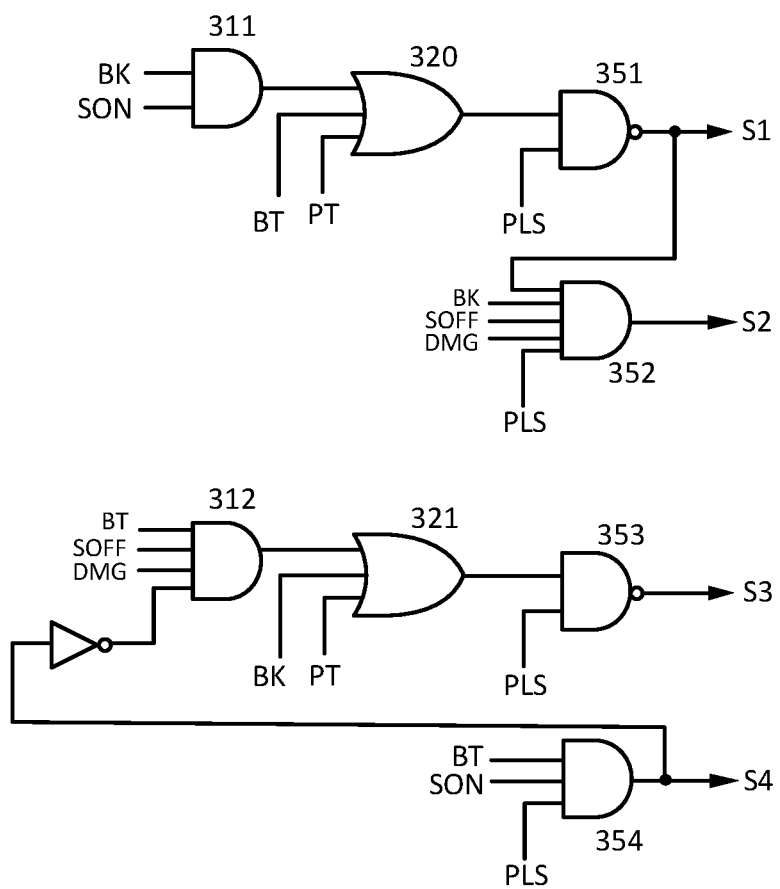
FIG. 10 shows a schematic diagram of a preferred embodiment of a driving logic circuit for generating the control signals according to the present invention.

FIG. 10 shows a schematic diagram of a preferred embodiment of a driving logic circuit 910 for generating the control signals according to the present invention. In one embodiment, the driving logic circuit 910 is configured to generate the control signal S1, S2, S3 and S4. Specifically, an output of an OR gate 320 is connected to a NAND gate 351 to enable the control signal S1 for the boost mode (i.e, enabled through BT) and the pass-through mode (i.e, enabled through PT) operations. For the buck mode, the control signal S1 is generated by the switching signal SON through an AND gate 311 (i.e, enabled through BK) and the OR gate 320. An AND gate 352 is configured to generate the control signal S2 according to the switching signal SOFF and the demagnetizing signal DMG for the buck mode operation (i.e, enabled through BK).

The output of an OR gate 321 is connected to a NAND gate 353 to enable the control signal S3 for the buck mode (i.e, enabled through BK) and the pass-through mode (i.e, enabled through PT) operations. For the boost mode, the control signal S3 is generated by the switching signal SOFF and the demagnetizing signal DMG through an AND gate 312 (i.e, enabled through BT) and the OR gate 321. An AND gate 354 is configured to generate the control signal S4 according to the switching signal SON for the boost mode operation (i.e, enabled through BT). In one embodiment, the control signals S1, S2, S3 and S4 are turned off when the pulse signal PLS is enabled. Therefore, the switches 10, 20, 30 and 40 are turned off before the operation mode is changed.

Figure 11:
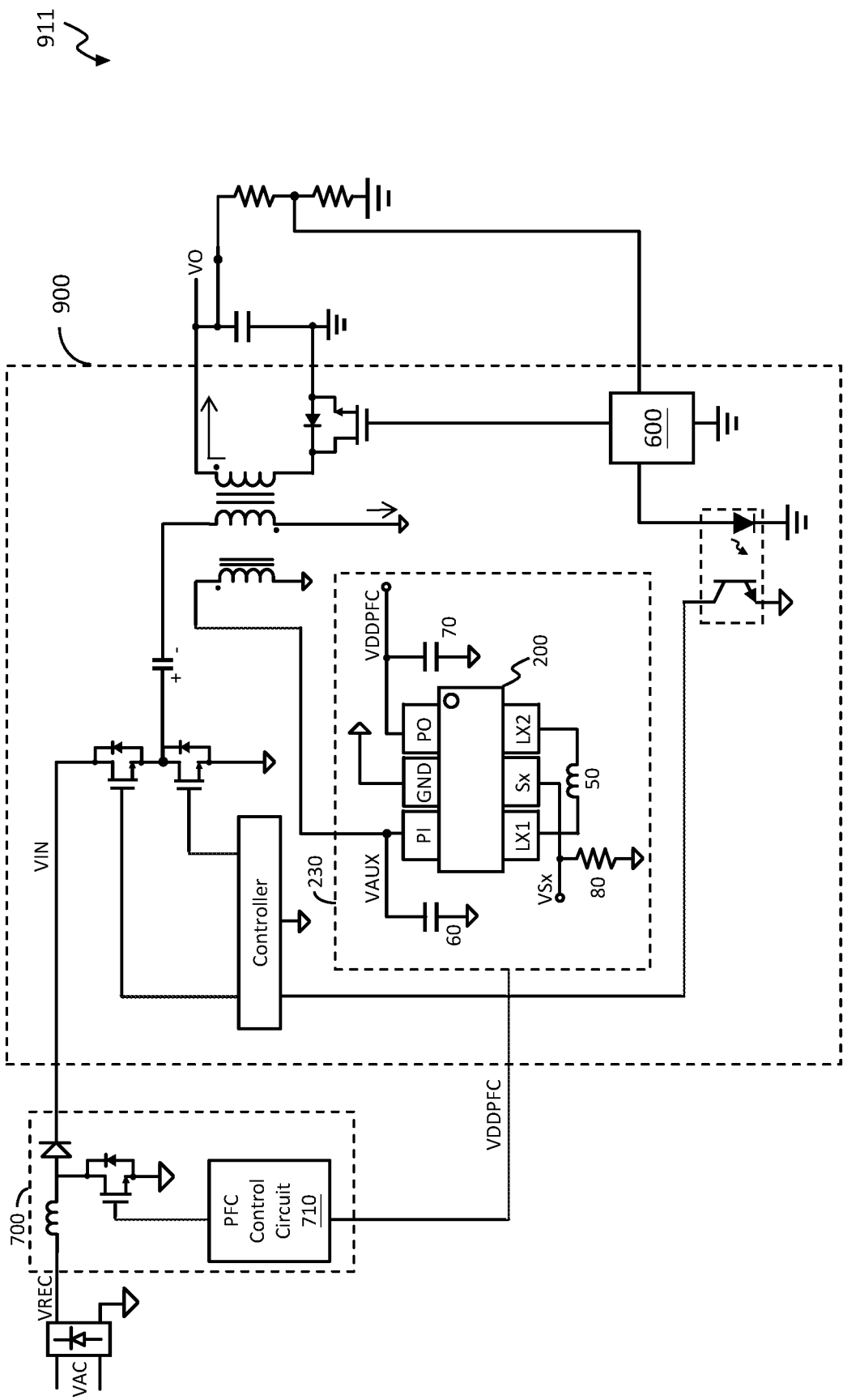
FIG. 11 and FIG. 12 show schematic diagrams of preferred embodiments of power adaptor utilizing the voltage regulator according to the present invention.
Figure 12:
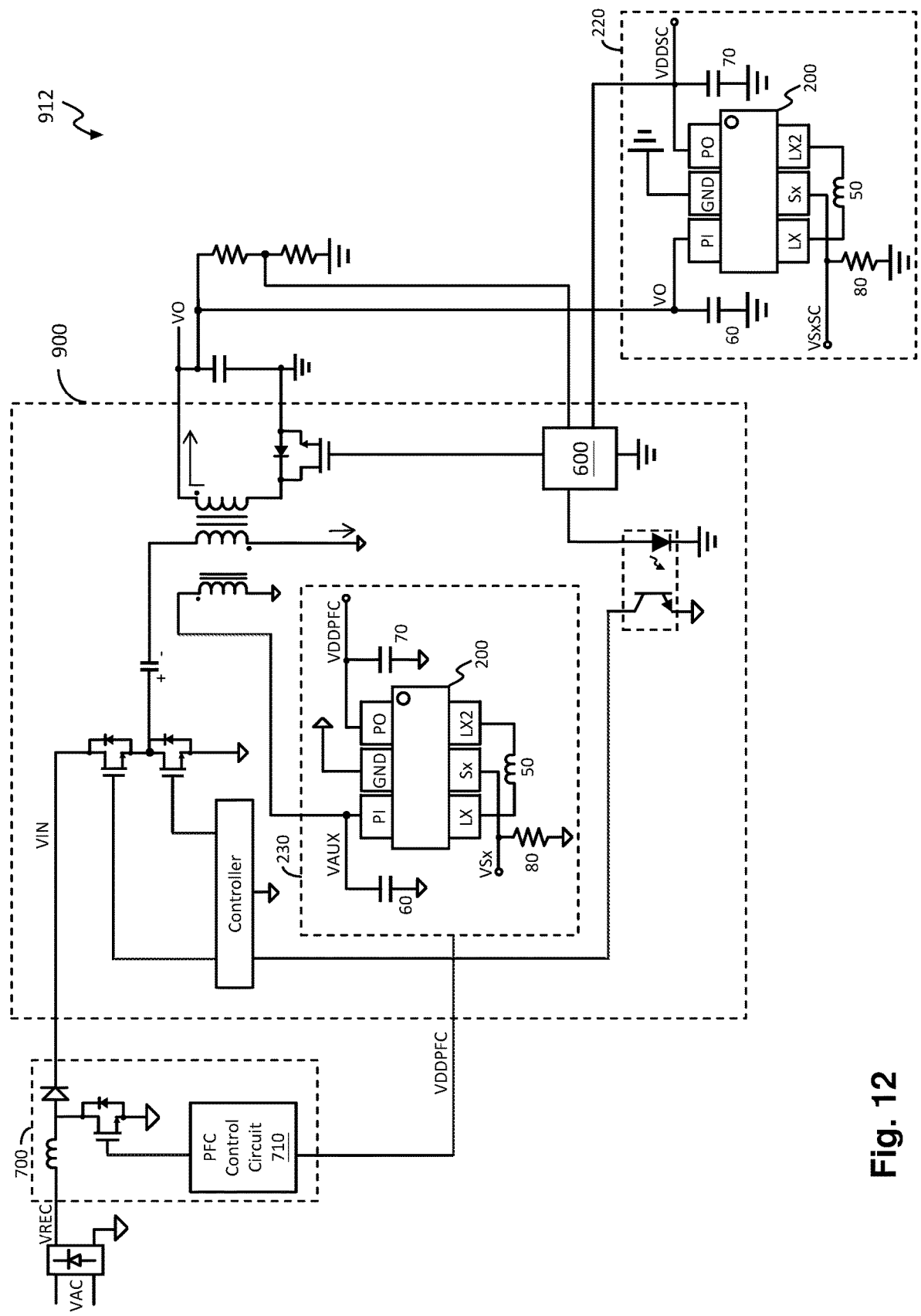

FIG. 11 and FIG. 12 show schematic diagrams of preferred embodiments of power adaptor (911, 912) utilizing the voltage regulator according to the present invention. In one embodiment, as shown in FIG. 11, the power supply apparatus 911 (912 the same), compliant with the USB-PD specification, includes a PFC (power factor correction) converter 700 which is configured to convert a rectified voltage VREC to generate an input voltage VIN. The power supply apparatus 911 (912 the same) further includes a flyback converter 900 configured to convert the input voltage VIN to a supply voltage VO.

In one embodiment, as shown in FIG. 11, the voltage regulator 230 is utilized to provide a bias supply VDDPFC for the PFC control circuit 710 of the PFC converter 700 inside the power supply apparatus 911. More specifically, the voltage regulator 230 is configured to convert an auxiliary voltage VAUX generated from an auxiliary winding of the transformer 10 of the flyback converter 900 to the bias supply VDDPFC.

In another embodiment, as shown in FIG. 12, the voltage regulator 220 is utilized to provide a bias supply VDDSC for the secondary side controller 600 of the flyback converter 900 using the output power (i.e., supply voltage VO) of the power supply apparatus 912 compliant with the USB-PD specification. More specifically, the voltage regulator 220 is configured to convert the supply voltage VO to the bias supply VDDSC.

Figure 13:
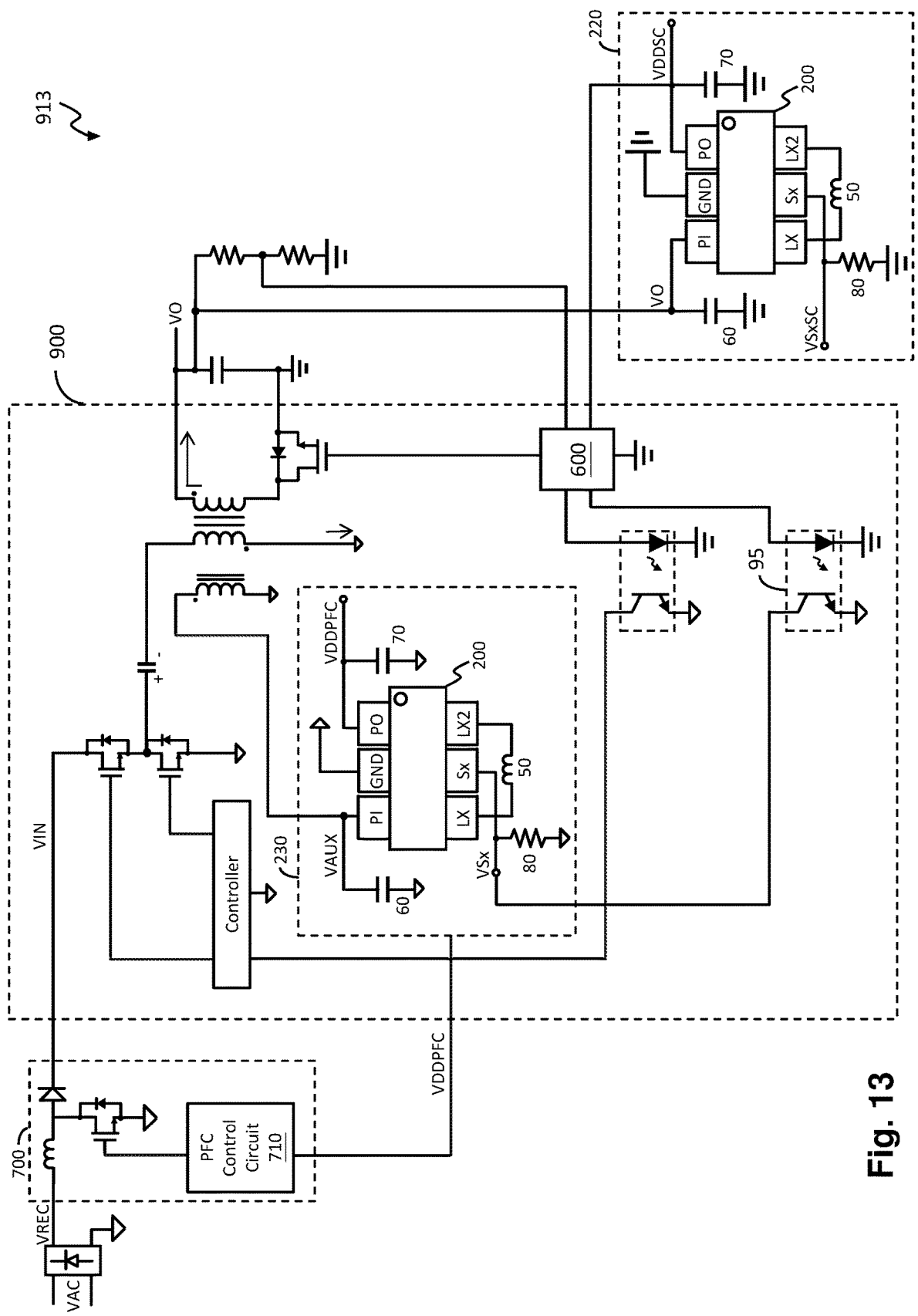
FIG. 13 shows a schematic diagram of a preferred embodiment of a power supply apparatus utilizing the voltage regulator according to the present invention.

FIG. 13 shows a schematic diagram of a preferred embodiment of a power supply apparatus 913 utilizing the voltage regulator according to the present invention. In one embodiment, as shown in FIG. 13, a secondary side controller 600 of the power supply apparatus compliant with the USB-PD specification generates a FPT control signal to control the control terminal Sx of the voltage regulator 230 through an opto coupler 95.

Note that, the voltage regulator of the present invention can offer a highly efficiency, such that the regulated bias supply can be less than 1 W (one watt) for the conversion control circuit of a USB-PD power supply apparatus or any conversion control circuit utilizing a USP-PD power supply apparatus. In a standby or a no-load operation, the output voltage of the USB-PD power supply apparatus is fixed at 5V. By pulling down the voltage on the control terminal Sx, the conversion control circuit can activate the voltage regulator's pass-through mode, so as to achieve a low standby power consumption.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A voltage regulator, configured to convert an input voltage to an output voltage, comprising:
   a first high-side switch, coupled to the input voltage, and coupled to an inductor through a first switch node;
   a first low-side switch, coupled to the first high-side switch, and coupled to the inductor through the first switch node;
   a second high-side switch, coupled to the output voltage, and coupled to the inductor through a second switch node;
   a second low-side switch, coupled to the second high-side switch, and coupled to the inductor through the second switch node; and
   a control terminal, configured to operably generate a reference voltage or determine a forced pass-through mode, wherein the output voltage is determined according to the reference voltage during a buck mode and a boost mode;
   wherein when the input voltage is higher than a first threshold, the voltage regulator is operated in the buck mode;
   wherein when the input voltage is lower than a second threshold, the voltage regulator is operated in the boost mode;
   wherein when the input voltage is lower than the first threshold and the input voltage is higher than the second threshold, the voltage regulator is operated in a pass-through mode;
   wherein when a voltage of the control terminal is lower than a third threshold, the voltage regulator is operated in the forced pass-through mode.

2. The voltage regulator as claimed in claim 1, further comprising a current source coupled to the control terminal; wherein the current source is applied to a resistor connected to the control terminal to determine the voltage level of the reference voltage.

3. The voltage regulator as claimed in claim 1, wherein the reference voltage is coupled to generated the first threshold and the second threshold.

4. The voltage regulator as claimed in claim 1, wherein a level of the first threshold is higher than a level of the second threshold, and the level of the second threshold is higher than a level of the third threshold.

5. The voltage regulator as claimed in claim 1, wherein the forced pass-through mode is enabled by pulling the voltage of the control terminal to a low level when the input voltage is lower than the first threshold.

6. The voltage regulator as claimed in claim 1, further comprising a first hysteresis-comparator and a second hysteresis-comparator;
   wherein the first hysteresis-comparator is coupled to receive the input voltage and the first threshold for determining the buck mode or the pass-through mode operation of the voltage regulator;
   wherein the second hysteresis-comparator is coupled to the input voltage and the second threshold for determining the pass-through mode or the boost mode operation of the voltage regulator when the input voltage is lower than the second threshold.

7. The voltage regulator as claimed in claim 1, wherein the voltage regulator is configured with a constant on-time (COT) control; wherein in the buck mode, an on-time of the first high-side switch is decreased in response to the increase of the input voltage, and the first high-side switch has a minimum off-time.

8. The voltage regulator as claimed in claim 1, wherein in the boost mode, the voltage regulator is configured with a constant on-time (COT) control, and an on-time of the second low-side switch is decreased in response to the increase of the input voltage, and the second low-side switch has a minimum off-time.

9. The voltage regulator as claimed in claim 1, wherein the voltage regulator is operated in discontinuous current mode (DCM) for the buck mode and the boost mode.

10. The voltage regulator as claimed in claim 1, wherein the first low-side switch is turned off before the inductor is fully demagnetized when the voltage regulator is operated in the buck mode.

11. The voltage regulator as claimed in claim 1, wherein the second high-side switch is turned off before the inductor is fully demagnetized when the voltage regulator is operated in the boost mode.

12. The voltage regulator as claimed in claim 1, wherein during the pass-through mode operation, the first high-side switch and the second high-side switch are turned on, and, the first low-side switch and the second low-side switch are turned off.

13. The voltage regulator as claimed in claim 1, wherein the first high-side switch, the second high-side switch, the first low-side switch and the second low-side switch are turned off before the operation mode is changed among the buck mode, the boost mode and the pass-through mode.

14. The voltage regulator as claimed in claim 1, wherein the voltage regulator is utilized to provide a bias supply for a conversion control circuit inside a power supply apparatus compliant with the USB-PD specification or for the conversion control circuit using an output power of the power supply apparatus compliant with the USB-PD specification.

15. The voltage regulator as claimed in claim 14, wherein the power supply apparatus compliant with the USB-PD specification includes a flyback converter.

16. The voltage regulator as claimed in claim 15, wherein a secondary side controller of the power supply apparatus compliant with the USB-PD specification controls the control terminal through an opto coupler.

17. The voltage regulator as claimed in claim 1, wherein an output power of the voltage regulator is less than 1 W (watt).

\* \* \* \* \*